United States Patent [19]

McGuire et al.

[11] Patent Number: 4,791,348

[45] Date of Patent: Dec. 13, 1988

[54] SWITCHING AC VOLTAGE REGULATOR

[75] Inventors: Thomas B. McGuire; Charles M. Holmes, Jr., both of San Diego, Calif.

[73] Assignee: Square D Company, Palatine, Ill.

[21] Appl. No.: 141,323

[22] Filed: Jan. 6, 1988

[51] Int. Cl.⁴ ............................................. G05F 1/26
[52] U.S. Cl. .................................... 323/263; 323/344
[58] Field of Search ............... 323/247, 255, 258, 259, 323/263, 343, 344

[56] References Cited

U.S. PATENT DOCUMENTS

| | | | |
|---|---|---|---|
| 2,180,193 | 11/1939 | Brand | 323/255 |
| 3,295,053 | 12/1966 | Perrins . | |
| 3,360,714 | 12/1967 | Borkovitz et al. | 323/258 |
| 3,371,246 | 2/1968 | Kawauchi et al. | 323/344 |
| 3,596,172 | 7/1971 | Harrison . | |
| 3,944,909 | 3/1976 | Reymond . | |
| 4,745,352 | 5/1988 | McGuire | 323/263 |

FOREIGN PATENT DOCUMENTS 421984  3/1974  U.S.S.R. ............................ 323/247

OTHER PUBLICATIONS

Thomas, Charles E., "60 Hz Electronic Power Conditioner Regulates Voltage, Attenuates Transients and Harmonics," *PCIM*, Dec. 1986, pp. 16-20.

Primary Examiner—William H. Beha, Jr.
Attorney, Agent, or Firm—Pretty, Schroeder, Brueggemann & Clark

[57] ABSTRACT

A pulse-width ac voltage regulator that provides a precisely ac output voltage without the need for any inefficient protective circuitry for ensuring proper operation when it repeatedly switches between its two alternative operating modes. A transformer is arranged with a first winding connected between an input terminal and an output terminal and a second winding connected between one end of the first winding and a control terminal. A special switch assembly including four separate circuits, each having a series connected transistor and diode, is controllably switched such that the second winding is alternatively shorted or excited, to provide a stepped-up (or stepped-down) voltage out of the first winding. The transistors are controllably switched at a frequency substantially greater than that of the ac input signal and at a duty cycle selected to provide the desired ac output voltage. Each time a transistor in the assembly is biased ON or OFF, electrical current is immediately diverted from one transistor to another, without the need for any inefficient snubber circuit or the like.

11 Claims, 4 Drawing Sheets

SWITCHING AC VOLTAGE REGULATOR

BACKGROUND OF THE INVENTION

This invention relates generally to ac voltage regulators, and, more particularly, to switched ac voltage regulators that are highly efficient and provide a precise, continuously-variable voltage control.

Switching ac voltage regulators of this particular kind have been devised as a means of saving electrical power and thus reducing electric utility bills. Ac power supplied by utility companies is usually provided at a nominal voltage, plus or minus about 5 percent on a long term average. Short term deviations can be as great as plus or minus 10 percent of the nominal voltage.

Most electrical equipment is designed to operate as high as about 10 percent over the nominal voltage and as low as about 12 to 15 percent under the nominal voltage. The additional tolerance for low voltage is required to accommodate voltage drops that frequently occur in building wiring, between the utility entrance and the equipment.

If the electrical power supplied by the utility company is closely regulated to a constant voltage at the utility entrance, or at major distribution points within the user's facility, the voltage can be controlled at the minus 10 percent level, to reduce the power consumed. A voltage level of minus 7 or 8 percent could be used to provide some safety margin, if needed. This adjustment may be made by the individual user, to suit the specific need.

Many additional benefits are realized by operating electrical equipment at 7 to 10 percent below its nominally rated voltage. At such voltages, most electrical equipment operates at a lower temperature and has a longer lifetime.

To obtain the maximum benefit in energy savings, the ac voltage regulator for regulating the voltage to the desired, sub-nominal level, must be highly efficient and must have very fast response in correcting for dips in the input voltage so that the output voltage is not allowed to dip below the desired sub-nominal level for a time period that could cause improper operation of sensitive equipment making up the load. Given the present efficiency of commercial transformers and semiconductor switches, an efficiency rate of greater than 99 percent and a response time on the order of one millisecond should be achievable.

One prior switching ac voltage regulator of this particular kind includes a transformer with a secondary winding connected between the regulator's input and output terminals and a primary winding that is controlled to alternately carry a bucking current or a boosting current, such that the voltage and current supplied to the output terminal for delivery to a load are alternately decreased and increased, correspondingly. The duty cycle of the alternate switching between bucking and boosting current is controllably adjusted to provide a desired average (i.e., regulated) ac voltage output. Although such voltage regulators have proven generally effective in providing a continuously-variable, precisely-controlled regulated voltage, their efficiency is not believed to be as high as is practically possible. Further, additional circuitry such as snubber circuits and other protective circuits are required to ensure proper operation each time the regulator switches between a buck mode and a boost mode.

It should, therefore, be appreciated that there is a need for an improved, highly efficient switching ac voltage regulator that provides a precise, continuously-variable voltage control without the need for inefficient, protective circuitry for ensuring proper operation when the regulator switches between two alternative operating modes. The present invention fulfills this need.

SUMMARY OF THE INVENTION

The present invention is embodied in a pulse-width modulated ac voltage regulator that provides a regulated ac output signal without the need for any inefficient protective circuitry of the kind used in the past to ensure proper operation of the regulator when it repeatedly switches between two alternative operating modes. The regulator includes a transformer having first and second windings and ac switching means for alternately connecting the transformer windings in two separate configurations. In a first switch configuration, the windings are shorted out and the ac output signal is substantially the same as the ac input signal, and in a second switch configuration, the windings are connected so as to transform the ac input signal and cause the ac output signal to have an instantaneous voltage that is a predetermined percentage (either greater or less than) of the instantaneous voltage of the ac input signal. The switching duty cycle of the alternate configurations provides a selected average (i.e., regulated) voltage for the ac output signal. The switching means includes four separate switching circuits, each containing a series-connected transistor and diode.

In accordance with the invention, quadrant detection means determines the voltage polarity and current direction of the ac output signal and produces a corresponding quadrant signal having four possible states, and control means, responsive to the quadrant signal, controllably biases selected pairs of four transistors in the ac switching means so as to alternate between the first and second switch configurations at an appropriate modulation frequency and duty cycle. For each of the four possible states of the quadrant signal, the control means biases a first predetermined transistor ON continuously and a second predetermined transistor alternately ON and OFF at the modulation frequency. Each time the second transistor is biased ON, the diode connected in series with the associated first transistor become reversed biased and electrical current is immediately diverted from the first transistor to the second transistor, without the need for any snubber circuit. In addition, each time the second transistor is biased OFF, electrical current is immediately diverted from the second transistor to the associated first transistor, likewise without the needs for any snubber circuit. When voltage polarity or current direction of the ac output signal changes, this is detected by the quadrant detection means and the control means thereupon changes its controllable biasing of two transistors in the four series-connected transistor and diode circuits.

More particularly, the transformer includes a first winding connected between an input terminal and an output terminal and a second winding connected between one end of the first winding and an intermediate node. The ac input signal is received on the input terminal and the ac output signal is supplied to the output terminal. Both signals are referenced to a neutral line. Two of the four series-connected transistor/diode circuits of the switching means are connected between the output terminal and the intermediate node, with each circuit adapted to couple current in an opposite direction from the other. Similarly, the remaining two series-connected transistor/diode circuits of the switching means are connected between the intermediate node and the neutral line, with each being adapted to couple current in a direction opposite from that of the other.

The particular associated pairs of transistors that are biased ON at any particular time, one being biased ON continuously and the other being biased alternately ON and OFF at the prescribed duty cycle, is determined by the quadrant detection means in accordance with the voltage polarity and current direction of the ac output signal. The quadrant detection means makes this determination using three separate comparator means. A first comparator means compares the instantaneous voltages at the output terminal and the intermediate node, a second comparator means compares the instantaneous voltages at the intermediate node and the neutral line, and a third comparator means compares the instantaneous voltages at the output terminal and the neutral line.

In an independent feature of the invention, the control means for controllably biasing the ac switching means so as to provide the desired regulated voltage for the ac output signal includes comparator means for computing the instantaneous ratio of the ac output signal and an ac reference signal having a frequency and phase substantially the same as the ac input signal. The comparator means produces a corresponding error signal that is then used to produce a pulse-width modulation signal having a duty cycle corresponding to the level of the error signal. The pulse-width modulation signal is connected to the ac switching means, to control the switching between the alternate first and second switch configurations. The ac reference signal is produced using a phase-locked loop that generates a frequency signal synchronized in frequency and phase with the ac input signal.

Other features and advantages of the present invention will become apparent from the following description of the preferred embodiments, taken in conjunction with the accompanying drawings, which illustrate, by way of example, the principles of the invention.

DESCRIPTION OF THE PREFERRED EMBODIMENTS

Figure 1:
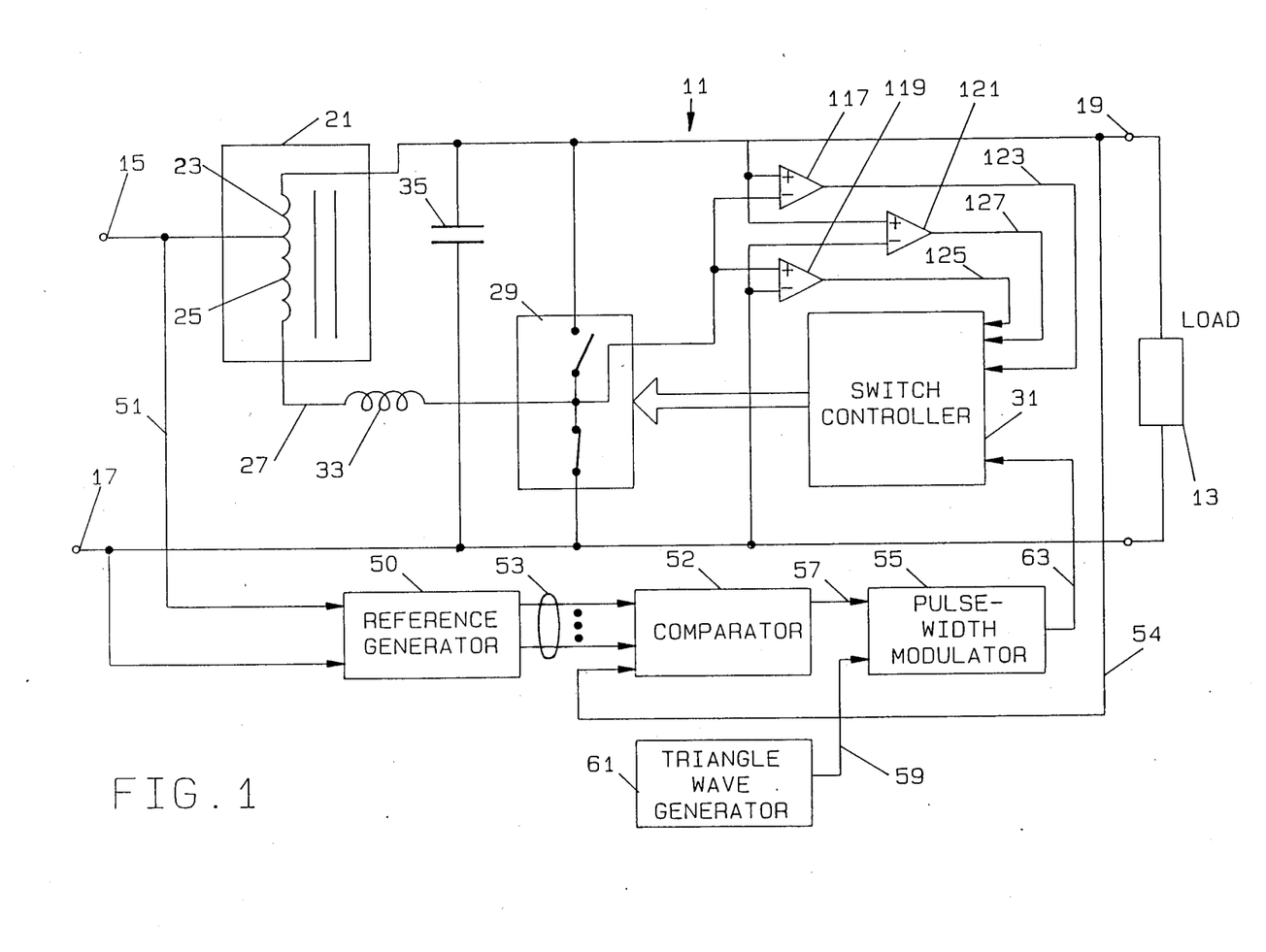
FIG. 1 is a simplified block diagram of one embodiment of an ac voltage regulator in accordance with the present invention, this embodiment providing a regulated output voltage that is higher than the input voltage.

With reference now to the drawings, and particularly to FIG. 1, there is shown a switching ac voltage regulator 11 that provides a continuously-variable, precisely-controlled ac output voltage, regardless of variations in the impedance of a load 13 or variations in the voltage of an ac input signal. The regulator receives an ac input signal via an input terminal 15, which is referenced to a neutral line 17, and it delivers an ac output signal having a regulated voltage to an output terminal 19, which is likewise referenced to the neutral line. The load is connected between the output terminal and the neutral line.

The regulator 11 includes a transformer 21 having a first winding 23 connected between the input terminal 15 and the output terminal 19 and a second winding 25 connected between the input terminal and a control terminal 27. A switch assembly 29, under the control of a switch controller 31, connects the control terminal, and thus the second winding, in either of two circuit configurations. In one such configuration, the control terminal is connected through an inductor 33 and a switch 29a of the switch assembly to the output terminal. This effectively shorts out the transformer windings 23 and 25 and shorts together the input and output terminals such that the ac output signal is substantially identical to the ac input signal. In a second, alternative configuration, the control terminal is connected through the inductor and a switch 29b of the switch assembly to the neutral line 17. This arranges the transformer in a step-up configuration, such that the ac output signal delivered to the output terminal has a voltage greater than that of the ac input signal.

The switch controller 31 controllably switches the switch assembly 29 so as to alternate between the two circuit configurations at a selected duty cycle. The average voltage of the ac output signal delivered to the output terminal 19, therefore, has a selected value between the minimum value, provided when the switch assembly is in its first configuration, and the maximum value, provided when the switch assembly is in its second configuration. A capacitor 35 connected between the output terminal and the neutral line 17 removes any high-frequency voltage variations caused by the repeated switching between the two configurations.

By way of example, if the voltage of the ac output signal is determined to be lower than desired, the switch controller 31 adjusts the duty cycle of the circuit configurations of the switch assembly 29 such that the assembly remains in its second configuration for a longer time duration. This increases the proportion of time that the transformer 21 provides a stepped-up output voltage and thus increases the ac output signal's average voltage until its desired, i.e., regulated, value is reached.

Figure 2:
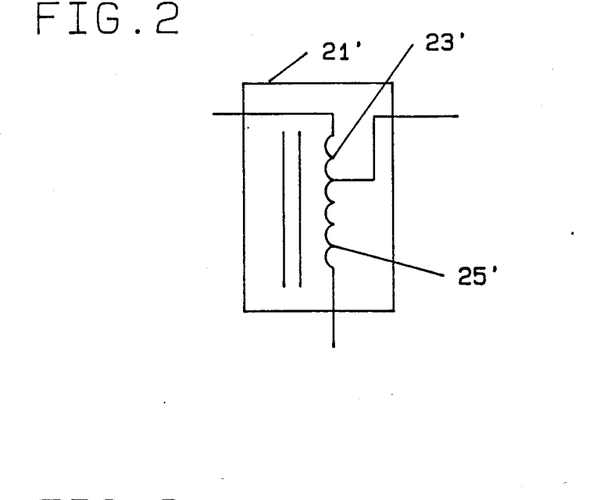
FIG. 2 is a schematic diagram of a transformer that can be substituted for the transformer of FIG. 1, such that the regulator provides a regulated output voltage that is lower than the input voltage.

It will be appreciated that the transformer 21 of FIG. 1 could alternatively be arranged in a step-down configuration. FIG. 2 depicts a transformer 21' having a suitable winding configuration that can be substituted directly for the transformer 21 of FIG. 1. When substituted, the transformer windings 23' and 25' will again be shorted out when the switch assembly 29 is in its first configuration and will provide a stepped-down voltage when the switch assembly is in its second configuration. As a result, the average voltage of the ac output signal provided by the regulator 11 at the output terminal 19 and will be equal to or less than the voltage of the ac input signal received at the input terminal 15. The specific output voltage will be determined by the duty cycles of the alternative switch configurations.

It also will be appreciated that selected output voltages both above and below the input voltage can be provided by using a step-down transformer (not shown) in series with the regulator 11 of FIG. 1. Similarly, in regulator embodiments that include the transformer 21' of FIG. 2 in place of the transformer 21 of FIG. 1, output voltages both above and below the input voltage can be provided by using a step-up transformer (not shown) in series with the regulator.

Thus, the switch controller 31 of FIG. 1 controls the conduction of the switches 29a and 29b such that an increased output voltage is provided by a higher conduction duty cycle for the switch 29b and a lower conduction duty cycle for the switch 29a. On the other hand, if the regulator were configured as a step-down regulator by substituting the transformer 21' of FIG. 2 (or by interchanging the input and the output functions between terminals 15 and 19, as described below), then the sense of the switch control would be reversed. Thus, in such a reconfigured regulator, an increased output voltage would be provided by a higher conduction duty cycle for the switch 29a and a lower conduction duty cycle for the switch 29b.

Figure 3:
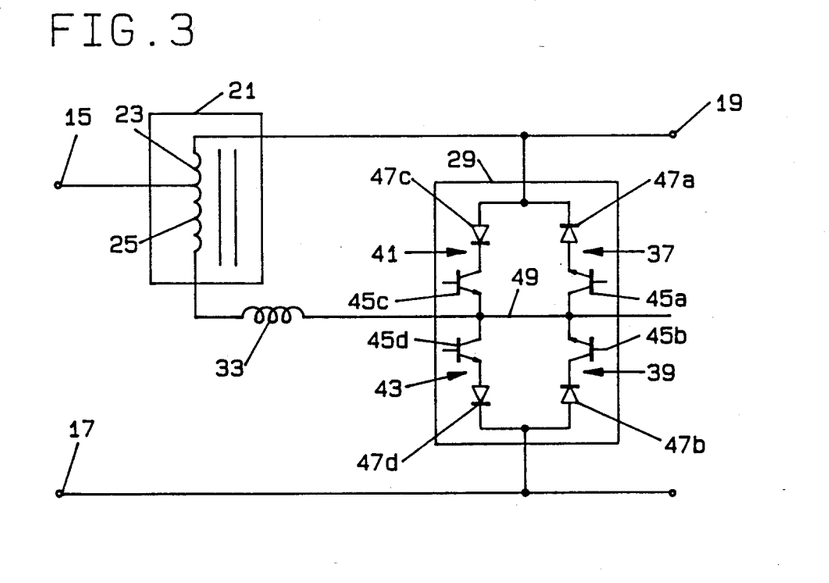
FIG. 3 is a schematic diagram of one suitable configuration for the transformer and switch assembly of FIG. 1.

FIG. 3 depicts one embodiment of a switch assembly 29 suitable for use in the ac voltage regulator 11 of FIG. 1. The assembly is controlled by the switch controller 31 such that is functions like the two analog switches depicted schematically in the block diagram of FIG. 1. The depicted switch assembly includes four separate circuits 37, 39, 41 and 43, each containing a separate series-connected transistor and diode. The first circuit 37 includes a transistor 45a and diode 47a connected to couple current from an intermediate node 49 to the output terminal 19. The second circuit 39 includes a transistor 45b and diode 47b connected to couple current from the neutral line 17 to the intermediate node. The third circuit 41 includes a transistor 45c and diode 47c connected to couple current from the output terminal to the intermediate node. Finally, the fourth circuit 43 includes a transistor 45d and diode 47d connected to couple current from the intermediate node to the neutral line. The intermediate node is coupled to the control terminal 27 of the transformer 21 via the inductor 33. This inductor could consist merely of the leakage inductance of the transformer's second winding 25.

Selected transistors of the four transistor/diode circuits 37, 39, 41 and 43 are controllably biased ON by the switch controller 31 (FIG. 1), such that electrical current is directed alternately through either the first or third circuits to or from the output terminal 19 and through either the fourth or second circuits to or from the neutral line 17. One important feature of the switch assembly circuit of FIG. 3 is that each time any one of the transistors is controllably switched ON or OFF, electrical current is immediately diverted from one transistor to another without the need for any protective snubber circuit or the like.

The determination of which transistors to bias ON or OFF in order to effect the desired current switching depends of the voltage polarity and current direction of the ac output signal supplied to the output terminal 19. The following Table I indicates the appropriate transistors to be biased ON for each of four possible combinations of voltage polarity and current direction. For convenience, the four possible combinations are identified by quadrant numbers 1 through 4.

TABLE I

| Quadrant | Voltage Polarity | Current Direction | Transistor Biased ON Continuously | Transistor Modulated ON and OFF |
|---|---|---|---|---|
| 1 | + | + | 45a | 45d (ON/OFF) |
| 2 | + | − | 45b | 45c (OFF/ON) |
| 3 | − | − | 45c | 45b (ON/OFF) |
| 4 | − | + | 45d | 45a (OFF/ON) |

Thus, by way of example, in quadrant 1, where the voltage of the ac output signal is positive (i.e., the voltage at the output terminal 19 exceeds the voltage at the neutral line 17) and electrical current is being delivered through the load 13 from the output terminal to the neutral line, the transistor 45a is biased ON continuously while the transistor 45d is modulated ON and OFF at the prescribed duty cycle. When the transistor 45d is biased OFF, such that only the transistor 45a is conducting, current is delivered through the second winding 25 of the transformer 21, the inductor 33, the transistor 45a, and the diode 47a to the output terminal. All of the other three transistors 45b, 45c and 45d are biased OFF and are thus non-conducting. When the OFF duty cycle of the transistor 45d is concluded and that transistor is biased ON, current is immediately diverted from the transistor 45a to the transistor 45d and from there through the diode 47d to the neutral line 17. At this time, the intermediate node 49 will be at a voltage just slightly more than one diode drop above the voltage of the neutral line and, because the voltage at the output terminal is positive (in quadrant 1), the diode 47a will be reverse biased and no current will flow through the transistor 45a and diode 47a, even though the transistor 45a is biased ON.

Subsequently, when the ON duty cycle of the transistor 45d has been completed, that transistor will again be biased OFF and the current previously flowing through it will immediately be diverted back through the transistor 45a and its associated diode 47a. As previously mentioned, this latter transistor 45a is biased ON continuously, even when the transistor 45d is also biased ON. No special snubber circuitry is required to handle the current being conducted through the transformer's second winding 25 and the inductor 33 at the time of either switchover. This is because, at all times, a current path through one (and only one) of the transistors is provided. In addition, the circuit is never configured such that a direct current path exists between the output terminal 19 and the neutral line 17.

Similar relationships between the transistor/diode circuits 37, 39, 41 and 43 exist when the regulator 11 is operating in any of the other three quadrants, as defined in Table I. In each case, when the particular transistor being modulated ON and OFF undergoes a change in bias, current will immediately be diverted from a current path through one transistor to a current path through the other, associated transistor. Again, no snubber circuitry is required and there is no risk that a direct current path will be provided between the output terminal 19 and the neutral line 17.

When operating in the first and third quadrants, modulated transistors 45d and 45b, respectively, are biased ON when a voltage boost is desired and biased OFF when no voltage boost is desired. Conversely, in the second and fourth quadrants, the modulated transistors 45c and 45a, respectively, are biased OFF when a voltage boost is desired and biased ON when no voltage boost is desired.

With reference again to FIG. 1, the portion of the regulator 11 that provides the desired pulse-width modulation signal for use by the switch controller 31 in controlling the switch assembly 29 will be described. The signal is based on a comparison of the voltage of the ac output signal at the terminal 19 with a precision sine wave reference signal. The precision reference signal is produced by a reference generator 50 based on the ac input signal supplied to it on line 51 from the input terminal 15. As will be described below in greater detail, the reference generator includes a phase-locked loop for ensuring that the reference signal has a frequency and phase substantially identical to that of the ac input signal. The resulting reference signal is a digital signal that changes from one value to the next at a rate substantially greater than (e.g., several hundred times) the frequency of the ac input signal.

A comparator 52 receives the digital reference signal on lines 53 from the reference generator 50 and compares that signal with the ac output signal supplied to it on line 54 from the output terminal 19. In particular, the comparator computes the instantaneous ratio of the reference signal and output signal and generates an error signal proportional to that ratio. A ratio rather than absolute difference is computed, because if the output signal differs from the reference signal by a particular percentage throughout the cycle, the regulator 11 should be seeking to correct the output signal by a uniform amount, continuously.

A pulse-width modulator 55 receives the error signal on line 57 from the comparator 52 and compares it with a periodic triangle wave signal supplied to it on line 59 from a triangle wave generator 61. In a straightforward comparison, the pulse-width modulator outputs a digital signal that is in a logical ONE state whenever the triangle wave signal exceeds the ratio signal and in a logical ZERO state whenever the triangle wave signal does not exceed the ratio signal. The resulting pulse-width modulation signal is transmitted on line 63 to the switch controller 31, for use in appropriately controlling the transistors 45a, 45b, 46c, and 45d of the switch assembly 29.

Figure 5:
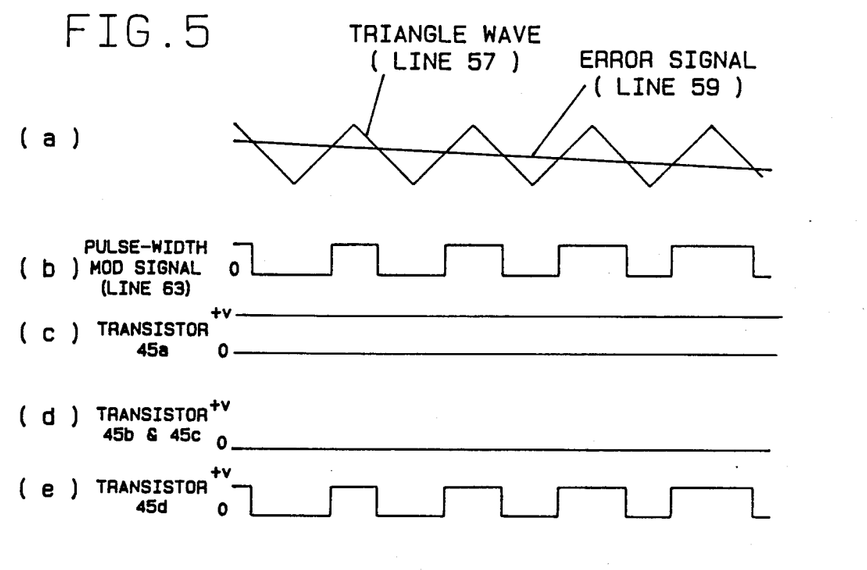
FIGS. 5(a) to 5(e) collectively are a timing diagram depicting several exemplary waveforms present at various nodes in the regulator of FIG. 1.

FIG. 5 depicts several exemplary waveforms useful in understanding how the pulse-width modulator 55 and switch controller 31 cooperate to control the switch assembly 29 so that the regulator 11 provides the desired regulated voltage. In FIG. 5(a), the triangle wave signal supplied to the pulse-width modulator 55 on line 59 is shown superimposed on the error signal supplied to it on line 57. The resulting pulse-width modulation signal output by the modulator on line 63 is depicted in FIG. 5(b). It will be noted that if the ratio signal is relatively low, it will be exceeded by the triangle wave signal for a proportionately longer time duration and the resulting pulse-width modulation signal will be in the logical ONE state for a correspondingly longer time duration. The switch controller 31 thereupon conditions the switch assembly 29 so as to step up the voltage of the ac input signal for a proportionately longer time duration and thus increase the average voltage of the ac output signal. Eventually, an equilibrium point will be reached in which a particular duty cycle for the pulse-width modulation signal will provide an ac output signal having the desired average voltage.

For completeness, the drive signals connected to the four transistors 45a, 45b, 45c, and 45d of the switch assembly 29 from the switch controller 31 are depicted in FIGS. 5(c)–(e), in registration with the pulse-width modulation signal. The exemplary drive signals are shown for operation of the regulator 11 in the first quadrant, where the ac output signal has a positive voltage polarity and a positive current direction. It will be observed that the drive signals bias the transistor 45a ON continuously and modulate the transistor 45d ON and OFF in accordance with the pulse-width modulation signal. The remaining two transistors 45b and 45c are biased OFF continuously.

Under ideal conditions, the dc voltage at the node 49 of the switch assembly 29 is zero. However, under certain circumstances, a non-zero dc voltage can arise, which can saturate the transformer 21 and cause the regulator to operate improperly. To prevent such an occurrence, a dc correction circuit 127 monitors the average dc voltage at the node 49 and delivers a dc correction control signal on line 133 to the pulse-width modulator 55. The pulse-width modulator is thereby conditioned to adjust the pulse-width modulation signal it outputs on line 63 so as to reduce the average dc voltage at the node 49 substantially to zero.

Figure 6:
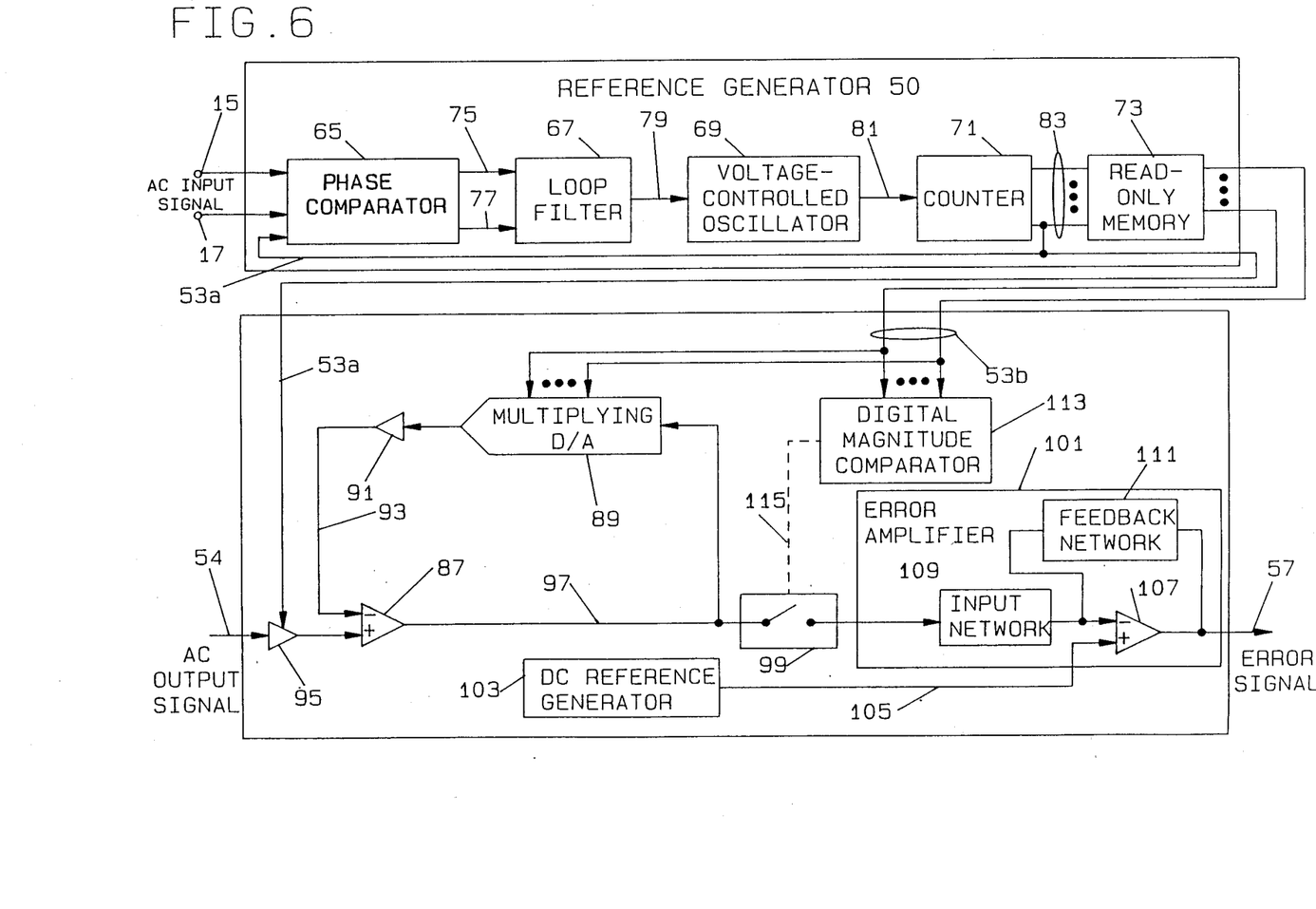
FIG. 6 is a simplified block diagram of the reference generator and comparator of FIG. 1.

FIG. 6 is a more detailed block diagram of the reference generator 50 and comparator 52 of FIG. 1. As previously mentioned, the reference generator generates a precision sine wave reference signal based on the ac input signal supplied to it on line 51 from the input terminal 15, and the comparator computes the instantaneous ratio of the ac output signal to this precision reference signal, outputting the error signal on line 57.

As depicted in FIG. 6, the reference generator 50 includes a phase comparator 65, a loop filter 67, a voltage-controlled oscillator (VCO) 69, counter 71, and a read-only memory (ROM) 73, connected together to function as a phase-locked loop to ensure that the reference signal has a frequency and phase angle substantially identical to that of the ac input signal. The phase comparator compares the timing of the zero crossings of the ac input signal received on line 15 with the most significant bit, i.e., sign bit, of the precision sine wave reference signal received on line 53a. Ideally, the two are precisely in phase and no output is provided by the phase comparator. However, if the ac input signal leads the sign bit, a digital pulse of corresponding duration is output on line 75. Conversely, if the ac input signal lags the sign bit, a pulse of corresponding duration is output on line 77. The loop filter receives the pulses on lines 75 and 77, and it increases its dc output signal in response to pulses indicating a phase lead and, conversely, decreases its dc output signal in response to pulses indicating a phase lag. The loop filter's dc output signal is coupled on line 79 to the VCO, which generates a digital clock signal having a frequency controlled by the dc level. Nominally, the frequency is on the order of several hundred (e.g., 512) times that of the ac input signal.

The clock signal output by the VCO 69 is transmitted on line 81 to the counter 71, which counts up to a count of several hundred, (e.g., 512), before returning to zero and resuming the count. The digital count is output by the counter as a sequence of multi-bit words on lines 83 to the address input terminals of the ROM 73. The ROM is programmed such that, in response to the succession of address words, it outputs a digital word sequence that follows a precision sine wave shape.

The digital sine wave reference signal, including the sign bit from the counter 71 and magnitude bits from the ROM 73, are supplied on lines 53a and 53b, respectively, from the reference generator 50 to the comparator 52, for dividing into the ac output signal supplied to it on line 54. As shown in FIG. 6, this division is conveniently accomplished in a feedback circuit in which the output ratio error signal is multiplied by the sine wave reference signal in the feedback path of an operational amplifier circuit 87. In particular, the multiplication is performed by a multiplying digital-to-analog (D/A) 89, with the resulting current being converted to a corresponding voltage in a current-to-voltage converter 91. The resulting voltage is connected on line 93 to the inverting input terminal of the operational amplifier, while the ac output signal is supplied through a switchable analog buffer 95 to the non-inverting input terminal of the operational amplifier. To allow the multiplying D/A to operate only on positive voltages, the sign bit of the reference signal is used in the buffer 95 to either invert or not invert the ac input signal, thus providing the same end result as would be provided if the multiplication were performed with both positive and negative voltages. When the comparator is operating in its proper fashion, the signals applied to the two input terminals of the operational amplifier will be identical to each other and the error signal generated by the operational amplifier will correspond exactly with the ratio of the ac output signal to the ac reference signal. The operational amplifier outputs this ratio signal an line 97.

As shown in FIG. 6, the comparator 52 further includes an analog switch 99, an error amplifier 101, and a dc reference generator 103. The ratio signal output on line 97 by the operational amplifier 87 is transmitted through the switch and amplified by the error amplified, for output as the error signal on line 57. The error amplifier actually compares the ratio signal with a precision dc reference signal supplied on line 105 from the dc reference generator, such that the error signal output on line 57 is offset from the ratio signal by a voltage proportional to the dc reference signal. The error amplifier includes an operational amplifier 107, with conventional input and a feedback networks 109 and 111, respectively, providing a selected frequency response for the regulator.

It will be appreciated that the comparator 52 sometimes will be required to operate with a divisor at or near zero. If this causes an inaccurate ratio error signal to be computed, no significant harm will result, because at that time the ac output signal will be at or near zero and any switching of the switch assembly 29 will have only a minimal effect on its value. However, a large error signal might tend to saturate the operational amplifier 107 of the error amplifier 101. To prevent this saturation, a digital magnitude comparator 113 outputs a control signal wherever the magnitude of the divisor (i.e., the digital sine wave reference signal on lines 53b) is near zero. This control signal is transmitted on line 115 to the analog switch 99, which then opens and uncouples the ratio signal from the error amplifier.

As previously mentioned, the selection of the particular transistors of the switch assembly 29 that are to be biased ON at any particular time is made by the switch controller 31 in accordance with a determination of the quadrant in which the regulator 11 is currently operating, as well as on the state of the pulse-width modulation signal supplied to it on line 63. The determination of the particular quadrant in which the regulator operates is made with the aid of comparators 117, 119 and 121, which are depicted in FIG. 1. The first comparator 117 monitors the relative voltages at the output terminal 19 and the intermediate node 49 of the switch assembly, the second comparator 119 monitors the relative voltages of the intermediate node and the neutral line 17, and the third comparator 121 monitors the relative voltages at the output terminal and the neutral line. The polarity signals output by the comparators 117, 119 and 121 are transmitted to the switch controller on lines 123, 125 and 127, respectively.

The following Table II indicates the quadrant determination for each possible combination of states for the comparator outputs and pulse-width modulation signal. The comparator outputs are designated ONE if the polarity is positive and ZERO if the polarity is negative. Combinations of states not identified in the table cannot ordinarily occur.

TABLE II

| Compar. 121 Polarity | Compar. 119 Polarity | Compar. 117 Polarity | Modulation Signal HIGH/LOW | Quadrant Determination |
|---|---|---|---|---|
| 1 | 1 | 0 | LOW | 1 |
| 1 | 1 | 1 | HIGH | 1 |
| 1 | 1 | 1 | LOW | 2 |
| 1 | 0 | 1 | HIGH | 2 |
| 0 | 0 | 1 | LOW | 3 |
| 0 | 0 | 0 | HIGH | 3 |
| 0 | 0 | 0 | LOW | 4 |
| 0 | 1 | 0 | HIGH | 4 |

If the voltage regulator 11 is operating in a particular quadrant and a change occurs in one of the three comparator signals output by the comparators 117, 119 and 121, that change will indicate a change to a new quadrant. This means that a different pair of transistors must then be biased ON by the switch controller 31, as indicated in Table I above. The following Table III indicates the change that must be effected in response to a detected change in one or more of the comparator signals.

TABLE III

| Present Quadrant | Detected Polarity Changes | | | New Quadr. Determin. |
|---|---|---|---|---|
| | Compar 121 | Compar 119 | Compar 117 | |
| 1 | 1 | 1 | 0 | 1 |
| 1 | 1 | 1 | 1 | 1 |
| 1 | 0 | 1 | 0 | 4 |
| 1 | 0 | 0 | 0 | 4 |
| 1 | 1 | 0 | 1 | 2 |
| 1 | 0 | 0 | 1 | 3 |
| 2 | 1 | 0 | 1 | 2 |
| 2 | 1 | 1 | 1 | 2 |
| 2 | 0 | 0 | 1 | 3 |
| 2 | 0 | 0 | 0 | 3 |
| 2 | 1 | 1 | 1 | 1 |
| 2 | 0 | 1 | 0 | 4 |
| 3 | 0 | 0 | 0 | 3 |
| 3 | 0 | 0 | 1 | 3 |
| 3 | 1 | 0 | 1 | 2 |
| 3 | 1 | 1 | 1 | 2 |
| 3 | 0 | 1 | 0 | 4 |
| 3 | 1 | 1 | 0 | 1 |
| 4 | 0 | 0 | 0 | 4 |
| 4 | 0 | 1 | 0 | 4 |
| 4 | 1 | 1 | 0 | 1 |
| 4 | 1 | 1 | 1 | 1 |
| 4 | 0 | 0 | 1 | 3 |
| 4 | 1 | 0 | 1 | 2 |

By way of example, if the regulator 11 is currently operating in the first quadrant (where the signals from the comparators 121, 119, and 117 are normally 1, 1 and 0, respectively, or 1, 0 and 1, are normally 1, 1 and 0, respectively, or 1, 1, and 1, respectively), if the comparator signals change to become 1, 0 and 1, respectively, it will be deduced that the regulator has advanced to the second quadrant of operation. In that quadrant, a different pair of transistors (i.e., transistors 45b and 45c) will be biased ON, as indicated in Table I, above.

To guard against random noise causing too many changes in the operating quadrant, the switch controller 31 is programmed not to effect any changes in its biasing of the transistors of the switch assembly 29 until the determination of a quadrant change has been repeated a certain number of clock times. This delay is still significantly less than one cycle of the ac input signal. In addition, responses to changes in the pulse-width modulation signal supplied on line 63 are delayed until the predetermined time delay has elapsed.

When a transition is made from one quadrant to another, such that a new pair of transistors is controllably biased, as described above, a short time period might occur during which none of the four transistors 45a, 45b, 45c and 45d is biased on. To protect against the buildup of an excessive voltage at the intermediate node 49, a pair of varisters (not shown) can interconnect that node with the ac output terminal 19 and the neutral line 17. This will not introduce any significant inefficiencies into the regulator's operation, because it can occur only two times for each cycle of the ac input signal and in addition, can occur only when the voltage or current level of the ac output signal is near zero (having just undergone a change in polarity or direction).

Figure 4:
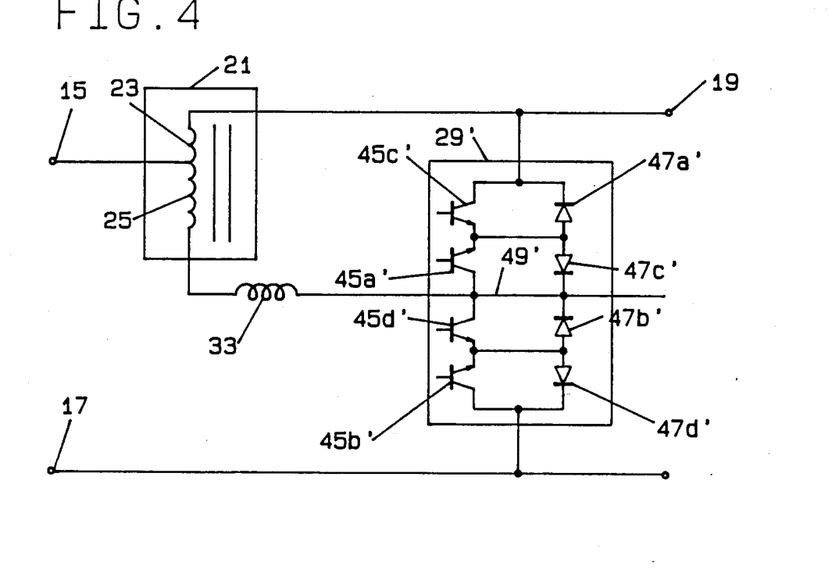
FIG. 4 is a schematic diagram of an alternative configuration for the transformer and switch assembly of FIG. 1

FIG. 4 depicts an alternative configuration for the transistor/diode circuits 37, 39, 41 and 43 of the switch assembly 29. It functions identically to the switch assembly of FIG. 3 and includes the same number of individual circuit components. In the embodiment of FIG. 4, however, the node between the transistor 45a' and diode 47a' of the first circuit 37' is connected to the node between the transistor 45c' and diode 47c' of the third circuit 41'. In addition, the positions of the transistors 45c' and diode 47c' are reversed from that of FIG. 3 such that current travels first through the transistor and then through the diode. Similarly, the node between the transistor 45b' and diode 47b' of the second circuit 39' is connected to the node between the transistor 45d' and diode 47d' of the fourth circuit 43'. In addition, the positions of the transistor 45b' and diode 47b' are reversed from that of FIG. 3 such that current travels first through the transistor and then through the diode.

In the switch assembly of FIG. 4, only two isolated power supplies are required to drive the four transistors 45a', 45b', 45c' and 45d', whereas three such power supplies are required in the case of the FIG. 3 switch assembly. Another advantage of the FIG. 4 circuit embodiment is that each diode is connected between the collector and emitter of one of the transistors, which is a configuration commonly provided in many transistor packages. Thus, the circuit of FIG. 4 could be provided using just four transistor packages, where as the circuit of FIG. 3 would require four transistor packages and four discrete diodes.

In the ac voltage regulator of FIG. 1, the ac input signal is connected to the terminal 15 and a regulated ac output signal is provided at the terminal 19. It will be appreciated, however, that the regulator also could function properly with the ac input signal connected to the terminal 19, in which case the ac output signal would be provided at terminal 15. In such a modified configuration, the connection for line 51 should be changes so as to transmit the input signal from terminal 19 to the reference generator 50, and the connection for line 54 should be changed so as to transmit the output signal from the terminal 15 to the comparator 52. In this modified configuration, the ac output signal would be regulated to a voltage level that is less than or equal to that of the ac input signal.

It should be appreciated from the foregoing description that the present invention provides an improved ac voltage regulator that provides a precisely regulated ac voltage for a range of input voltages and for a range of load impedances. The regulator responds in sigificantly less than a single cycle of the applied ac input signal, by switching alternately between two transformer configurations at a selected duty cycle. The regulator switches between these two alternative configurations in a highly efficient manner, without the need for any protective snubber circuitry or the like.

Although the invention has been described in detail with reference to the presently preferred embodiments, those of ordinary skill in the art will appreciate that various modifications can be made without departing from the invention. Accordingly, the invention is defined only by the following claims.

We claim:

1. An ac voltage regulator for receiving an ac input signal having a voltage to be regulated and providing an ac output signal having a regulated voltage, the regulator comprising:

a transformer having a plurality of windings;

ac switching means, including four switching circuits, each containing a series-connected transistor and diode, for alternately connecting the transformer windings in a first switch configuration, in which the windings are connected such that the ac output signal is substantially the same as the ac input signal, and a second switch configuration, in which the windings are connected so as to transform the ac input signal and cause the ac output signal to have an instantaneous voltage that is a predetermined percentage of the instantaneous voltage of the ac input signal, the duty cycle of the alternate configuration providing a selected average voltage for the ac output signal;

quadrant detection means for determining the instantaneous voltage polarity and current direction of the ac output signal and for producing a corresponding quadrant signal having four possible states; and control means, responsive to the quadrant signal, for controllably biasing selected transistors of the switching means so as to alternate between the first and second switch configurations at a predetermined modulation frequency substantially greater than the frequency of the ac input signal and at a prescribed duty cycle selected to provide a desired average voltage for the ac output signal;

wherein, for each of the four possible states of the quadrant signal, the control means biases a predetermined first transistor on continuously and biases a predetermined second transistor alternately on and off at the predetermined modulation frequency, wherein each time the second transistor is biased on, the diode connected in series with the associated first transistor becomes reverse biased and electrical current is immediately diverted from the first transistor to the second transistor, without the need for any snubber circuit, and wherein each time the second transistor is biased off, electrical current is immediately diverted from the second transistor to the associated first transistor, without the need for any snubber circuit.

2. An ac voltage regulator as defined in claim 1, wherein:
the ac input signal is received between the first and second input terminals and the ac output signal is supplied between first and second output terminals;
the transformer includes a first winding connected between the first input terminal and the first output terminal and a second winding connected between one end of the first winding and an intermediate node;
the second input terminal is connected directly to the second output terminal;
a load is connected between the first and second output terminals;
the first switching circuit of the switching means is connected to selectively couple current from the intermediate node to the first output terminal;
the second switching circuit of the switching means is connected to selectively couple current from the second output terminal to the intermediate node;
the third switching circuit of the switching means is connected to selectively couple current from the first output terminal to the intermediate node; and
the fourth switching circuit of the switching means is connected to selectively couple current from the intermediate node to the second output terminal.

3. An ac voltage regulator as defined in claim 2, wherein the quadrant detection means includes:
first comparator means for comparing the instantaneous voltages at the first output terminal and the intermediate node;
second comparator means for comparing the instantaneous voltages at the intermediate node and the second output terminal; and
third comparator means for comparing the instantaneous voltages at the first output terminal and the second output terminal.

4. An ac voltage regulator as defined in claim 2, wherein:
when the quadrant detection means determines the voltage polarity of the ac output signal is positive and the current direction of the ac output signal is into the load, from the first output terminal to the second output terminal, the transistor of the first switching circuit is biased on continuously and the transistor of the fourth switching circuit is biased alternately on and off at the prescribed duty cycle;
when the quadrant detection means determines the voltage polarity of the ac output signal is positive and the current direction of the ac output signal is out of the load, from the second output terminal to the first output terminal, the transistor of the second switching circuit is biased on continuously and the transistor of the third switching circuit is biased alternately on and off at the prescribed duty cycle;
when the quadrant detection means determines the voltage polarity of the ac output signal is negative and the current direction of the ac output signal is out of the load, from the second output terminal to the first output terminal, the transistor of the switching circuit is biased on continuously and the transistor of the second switching circuit is biased alternately on and off at the prescribed duty cycle; and
when the quadrant detection means determines the voltage polarity of the ac output signal is negative and the current direction of the AC output signal is into the load, from the first output terminal to the second output terminal, the transistor of the fourth switching circuit is biased on continuously and the transistor of the first switching circuit is biased alternately on and off at the prescribed duty cycle.

5. An ac voltage regulator as defined in claim 2, wherein the second winding of the transformer is connected between the first input terminal and the intermediate node, such that the voltage of the ac output signal is equal to or greater than the voltage of the ac input signal.

6. An ac voltage regulator as defined in claim 2, wherein the second winding of the transformer is connected between the intermediate node and the first output terminal, such that the voltage of the ac output signal is equal to or less than the voltage of the ac input signal.

7. An ac voltage regulator as defined in claim 1, wherein the control means includes:
reference means for generating an ac reference signal;
comparator means for comparing the ac output signal with the ac reference signal and producing a corresponding error signal;
means for producing a pulse-width modulation signal having a frequency corresponding to the predetermined modulation frequency and having a duty cycle that varies in accordance with the error signal; and
means for biasing the four transistors of the switch means in accordance with the pulse-width modulation signal.

8. An ac voltage regulator as defined in claim 7, wherein the comparator means includes means for computing the instantaneous ratio of the ac output signal and the ac reference signal, the error signal being proportional to the computed ratio.

9. An ac voltage regulator as defined in claim 7, wherein the reference means includes:
a phase-locked loop for generating a frequency signal synchronized in frequency and phase with the frequency and phase of the ac input signal; and
means for generating the reference signal and causing it to have frequency synchronized with that of the frequency signal.

10. An ac voltage regulator for receiving an ac input signal having a voltage to be regulated and for supplying an ac output signal having a regulated voltage, the regulator comprising:
a transformer having a plurality of windings;
ac switching means for alternately connecting the transformer windings between a first switch configuration, in which the windings are connected such that the ac output signal is substantially the same as the ac input signal, and a second switch configuration, in which the windings are connected so as to transform the ac input signal and cause the ac output signal to have an instantaneous voltage that is a predetermined percentage of the voltage of the ac input signal, wherein the switching between the alternate switch configurations occurs at a predetermined modulation frequency substantially greater than the frequency of the ac input signal and at a duty cycle selected to provide a predetermined average voltage for the ac output signal;

reference means for generating an ac reference signal having a frequency and phase substantially the same as the ac input signal;

comparator means for computing the instantaneous ratio of the ac output signal and the ac reference signal and for producing a corresponding error signal; and means for producing a pulse-width modulation signal having a frequency corresponding to the predetermined modulation frequency and having a duty cycle that varies in accordance with the error signal, the pulse-width modulation signal being used by the ac switching means to control its switching between the alternate first and second switch configurations.

11. An ac voltage regulator as defined in claim 10, wherein the reference means includes:

a phase-locked loop for generating a frequency signal synchronized in frequency and phase with the ac input signal; and means for generating the ac reference signal and causing it to have a frequency synchronized with that of the frequency signal.

* * * * *